US009680691B2

(12) United States Patent
Tahara et al.

(10) Patent No.: US 9,680,691 B2
(45) Date of Patent: Jun. 13, 2017

(54) CONNECTION ABNORMALITY DETECTION METHOD, NETWORK SYSTEM, AND MASTER DEVICE

(75) Inventors: Yutaka Tahara, Siga (JP); Hirohito Mizumoto, Siga (JP); Shigenori Sawada, Osaka (JP)

(73) Assignee: OMRON CORPORATION, Kyoto (JP)

( * ) Notice: Subject to any disclaimer, the term of this patent is extended or adjusted under 35 U.S.C. 154(b) by 440 days.

(21) Appl. No.: 14/003,345

(22) PCT Filed: Mar. 23, 2011

(86) PCT No.: PCT/JP2011/057006
§ 371 (c)(1),
(2), (4) Date: Oct. 29, 2013

(87) PCT Pub. No.: WO2012/124160
PCT Pub. Date: Sep. 20, 2012

(65) Prior Publication Data
US 2014/0047056 A1    Feb. 13, 2014

(30) Foreign Application Priority Data
Mar. 15, 2011    (JP) .................................. 2011-056390

(51) Int. Cl.
G06F 15/16    (2006.01)
H04L 12/24    (2006.01)
(Continued)

(52) U.S. Cl.
CPC ........ H04L 41/046 (2013.01); G05B 19/4185 (2013.01); H04L 12/2416 (2013.01);
(Continued)

(58) Field of Classification Search
CPC ...................................................... H04L 12/28
See application file for complete search history.

(56) References Cited

U.S. PATENT DOCUMENTS

2002/0062460 A1    5/2002  Okuda
2003/0016629 A1*   1/2003  Bender .................... H04L 1/22
                                                       370/245
(Continued)

FOREIGN PATENT DOCUMENTS

JP       11-136244       5/1999
JP       2002-158668     5/2002
(Continued)

OTHER PUBLICATIONS

International Search report for PCT/JP2011/057006, mail date is May 31, 2011.
(Continued)

Primary Examiner — Vivek Srivastava
Assistant Examiner — Nicholas Celani
(74) Attorney, Agent, or Firm — Greenblum & Bernstein, P.L.C.

(57) ABSTRACT

A technique is provided for detecting a connection abnormality of a slave device, in a network system including a master device and slave devices. The technique includes a connection abnormality detection method in a network system including a master device and a plurality of slave devices. In the network system, data is transmitted from the master device and then returned to the master device through respective slave devices. Each slave device has an upstream-side port and a downstream-side port. The connection abnormality detection method includes acquiring topology information of the network system, closing or opening the port of each slave device such that a serial topology is formed to include a target slave device located on the downmost stream side, transmitting inspection data after the control of the port, and detecting a connection abnormality of the device on the basis of a status of return of the inspection data.

4 Claims, 12 Drawing Sheets

(51) Int. Cl.
  *H04L 29/14* (2006.01)
  *H04L 12/26* (2006.01)
  *H04L 12/40* (2006.01)
  *H04L 29/12* (2006.01)
  *G05B 19/418* (2006.01)

(52) U.S. Cl.
  CPC .... *H04L 12/40019* (2013.01); *H04L 41/0677* (2013.01); *H04L 41/12* (2013.01); *H04L 43/0811* (2013.01); *H04L 61/2038* (2013.01); *H04L 69/40* (2013.01); *H04L 41/22* (2013.01); *H04L 43/50* (2013.01); *Y02P 90/18* (2015.11)

(56) References Cited

U.S. PATENT DOCUMENTS

| | | | | |
|---|---|---|---|---|
| 2007/0283042 | A1* | 12/2007 | West | H04L 65/80 709/238 |
| 2008/0091862 | A1 | 4/2008 | Hiraka | |
| 2010/0306511 | A1* | 12/2010 | Mochizuki | H04L 12/413 712/225 |

FOREIGN PATENT DOCUMENTS

| | | |
|---|---|---|
| JP | 2003-307538 | 10/2003 |
| JP | 2008-124791 | 5/2008 |
| JP | 2010-34876 | 2/2010 |
| JP | 2010-206252 | 9/2010 |
| WO | 2006/046775 | 5/2006 |

OTHER PUBLICATIONS

European Search Report in European Patent Application No. 11860869, dated Jul. 21, 2014.

Office Action issued in Japan Patent Appl. No. 2011-056390, dated Nov. 6, 2012, along with an English translation thereof.

* cited by examiner

CONNECTION ABNORMALITY DETECTION METHOD, NETWORK SYSTEM, AND MASTER DEVICE

TECHNICAL FIELD

The present invention relates to a connection abnormality detection method in a network system including a master device and a slave device. The present invention also relates to a network system and a master device.

BACKGROUND ART

In the field of FA (Factory Automation), various devices have been controlled to share the process of work. Various controllers, remote I/O units and manufacturing devices are used for work in a certain area such as a factory facility. In order to operate these devices in conjunction with one another, an industrial network system which is also called a field network is constructed for connecting among these devices.

A typical industrial network system includes various slave devices for data collection from and control of production equipment installed in a factory, and a master device for centralized administration of these slave devices. In such an industrial network system, the slave devices and the master device are connected to communicate with one another, so that the process of production is controlled.

A network having a master device and slave devices may adopt various topologies, such as a serial topology, a ring topology, a tree topology and a star topology, in accordance with collaborative operations and wiring conditions between devices.

In the serial topology, all slave devices are on one transmission path formed with a master device defined as a starting point. It is assumed herein that the master device is located on the upstream side. On the transmission path, an information signal from the upstream side sequentially passes through the slave devices connected in series, and reaches the downmost stream-side slave device. Thereafter, the information signal is sent back from the downmost stream side, and is returned to the master device.

In the ring topology, a master device has two ports, i.e., a port for sending an information signal and a port for receiving an information signal. The sent information signal is sequentially passed through slave devices, and then is returned to the master device through the receiving-side port. In the serial topology and the ring topology, as described above, an information signal passes through one transmission path which is not branched.

In the tree topology or the star topology, on the other hand, a path from a master device is branched. A hub device is disposed as a network device on the branched portion. The hub device has one port connected to the upstream side, and a plurality of ports for connecting slave devices to the downstream side. Alternatively, a slave device is directly connected to different slave devices in some cases.

A technology called an industrial Ethernet utilizing the technology of the Ethernet (registered trademark) has been under development as one example of the industrial network system directed to the field of FA. The industrial Ethernet is also called an engineering Ethernet or a real-time Ethernet, and is such a network that Ethernet-related technologies and devices are introduced into the field of FA in various layers. With regard to the industrial Ethernet, various groups have established and released open standards. One example of the standards is the EtherCAT (Ethernet for Control Automation Technology: registered trademark) promoted by the ETG (EtherCAT Technology Group).

The EtherCAT standards also support the various topologies described above, and allow a combination of a serial connection like a chain with a branch using a hub device. According to the EtherCAT, moreover, it is not that an information signal from a master device is received at only a specific address, but a single signal is utilized by all slave devices. The information signal contains control data for each slave device. Therefore, each slave device reads data therefor from the information signal, rewrites the data if necessary, and then transfers the information signal to the downstream-side slave device. Accordingly, the information signal reaches the downmost stream side without remaining at a certain position in a network. Therefore, it becomes possible to realize high-speed communication without data collision.

As described above, the information signal according to the EtherCAT travels throughout the network along a so-called unicursal route. This characteristic also applies to a topology including a branched portion. That is, when an information signal from a master device reaches a hub device which is a branched portion, a predetermined port is selected from a plurality of ports. Then, the information signal is transmitted to a slave device connected to the selected port. In a case where different slave devices are connected to the downstream side of this slave device, the information signal is sequentially passed through the downstream-side slave devices. The information signal reaches the downmost stream-side slave device, and then is returned to the hub device. Subsequently, the information signal is transmitted to the slave device connected to the different port of the hub device.

Japanese Unexamined Patent Publication No. 2008-124791 (Patent Document 1) discloses a method of monitoring a network failure in order to detect erroneous cable connections and erroneous settings in the Ethernet. Japanese Unexamined Patent Publication No. 2010-034876 (Patent Document 2) discloses a method of detecting occurrence of failures on a relay device and a communication line in a network, and identifying a position of the failure. However, none of the patent documents disclose a method of detecting a connection abnormality in an industrial network system where a master device communicates with a slave device.

PRIOR ART DOCUMENTS

Patent Documents

Patent Document 1: Japanese Unexamined Patent Publication No. 2008-124791 (May 29, 2008)
Patent Document 2: Japanese Unexamined Patent Publication No. 2010-034876 (Feb. 12, 2010)

SUMMARY OF THE INVENTION

Problems to be Solved by the Invention

The industrial network system constructed in accordance with the EtherCAT standards described above has the following problem. That is, it is difficult to detect a position of a connection abnormality such as a cable failure when such a connection abnormality occurs between the master device and the slave device. Therefore, the industrial network system requires much time for recovery from the failure as compared with a network system constructed in accordance with normal Ethernet standards preparing various countermeasures for failure detection. This problem is described below.

FIG. 2(a) illustrates a state that five nodes N1 to N5 are connected to a hub in accordance with the normal Ethernet standards. It is assumed herein that an abnormality occurs at a cable for connecting the node N4 to the hub. In order to detect whether a failure occurs at communication between the node N1 of a user and the different node, there is a method of sequentially designating the nodes in the network and determining whether the node N1 can communicate with each of the designated nodes. Herein, the method may employ a function such as a ping command for sending a packet to the counter node and requesting a reply. The method determines that the failure occurs when no reply is sent from the node N4. In addition, it is possible to realize quick failure detection by employing a mechanism for mutually monitoring the nodes.

FIG. 2(b) illustrates a network configuration constructed in accordance with the EtherCAT standards. Herein, a master device M and four slave devices S1 to S4 are connected in a serial topology. An information signal from the master device passes through all the slave devices so as to be sequentially transferred from the upstream side toward the downstream side as shown with circled numbers 1 to 4. The information signal reaches the slave device S4, and then is returned to the master device by the reverse route. Accordingly, even in the case where the information signal is not returned to the master device because of, for example, a cable failure between the slave device S3 and the slave device S4, the master device is incapable of grasping the position of the failure on the route.

In the case where the master device is incapable of detecting the position of the failure, there is a necessity to confirm each connection between the devices in order to identify the problem, which requires much time. Moreover, if the problem is intractable for a user, inspection by a customer engineer is required. As the result, there is a possibility that times and costs for recovery are further increased.

As described above, the EtherCAT has the characteristic that an information signal travels along a unicursal route. Therefore, the information signal is not transferred correctly in the network if the slave devices are not connected correctly in the network. As the result, expected control is not achieved. Examples of "incorrect connection" are as follows. That is, communication is partly or entirely failed because of the poor quality of a cable. Moreover, a wrong port is selected in a case where a cable is inserted into one of the ports of the slave devices. Accordingly, erroneous control in the process of production is caused if a position of a failure cannot be detected quickly, which results in the inhibition of stable operations of the entire network and leads to the degradation of usability.

Some EtherCAT vendors prepare mechanisms for dealing with a connection abnormality. For example, if an information signal is not returned within a predetermined period of time, the same information signal is sent again, so that the communication quality is improved in the entire system. However, this mechanism does not offer essential solutions to the failure, and is incapable of detecting a position where the failure occurs in the network. Further, the retransmission of the information signal consumes a certain communication resource, which may impose severe strain on a network band.

The present invention has been devised in view of the problems described above, and an object thereof is to provide a technique for detecting a connection abnormality of a slave device, in a network system including a master device and slave devices.

Means for Solving the Problems

In order to accomplish the object described above, the present invention provides a connection abnormality detection method in a network system including a master device and a plurality of slave devices and having configurations that data is transmitted from the master device, is sequentially passed from the upmost stream-side slave device to the downmost stream-side slave device, and then is returned to the master device, and each slave device has a plurality of ports including an upstream-side port for connection to the upstream-side device and at least one downstream-side port for connection to the downstream-side device. The connection abnormality detection method includes: an acquisition step of acquiring topology information indicating a topology of the network system, in the master device; a port control step of switching between closing and opening of the port of each slave device such that the downmost stream-side slave device is defined as a target slave device to be inspected and a serial topology is formed from the master device to the target slave device, on the basis of the topology information, in the master device; a transmission step of transmitting inspection data after the port control step, in the master device; and a detection step of detecting a connection abnormality of the target slave device on the basis of a status of return of the inspection data, in the master device.

According to the connection abnormality detection method, it is possible to confirm a connection abnormality by identifying a target slave device and then transmitting and receiving inspection data even in such a network system that data from a master device passes through all slave devices included in a topology. As the result, it becomes possible to easily identify a position of the abnormality and to inform a user of the position. Therefore, it is possible to quickly deal with the failure.

The present invention also provides a network system including: a master device; and a plurality of slave devices. Herein, data is transmitted from the master device, is sequentially passed from the upmost stream-side slave device to the downmost stream-side slave device, and then is returned to the master device. Moreover, each slave device has a plurality of ports including an upstream-side port for connection to the upstream-side device and at least one downstream-side port for connection to the downstream-side device. Further, the master device includes a topology acquisition part for acquiring topology information indicating a topology of the network system, a port control part for switching between closing and opening of the port of each slave device such that the downmost stream-side slave device is defined as a target slave device to be inspected and a serial topology is formed from the master device to the target slave device, on the basis of the topology information, a transmission and reception part for transmitting inspection data after the control by the port control part, and receiving the returned inspection data, and a determination part for detecting a connection abnormality of the target slave device on the basis of a status of return of the inspection data.

According to the network system, it also becomes possible to easily identify a position of an abnormality and to inform a user of the position. Therefore, it is possible to quickly deal with the failure.

The present invention also provides a master device in a network system including the master device and a plurality of slave devices and having configurations that data is transmitted from the master device, is sequentially passed from the upmost stream-side slave device to the downmost stream-side slave device, and then is returned to the master device, and each slave device has a plurality of ports including an upstream-side port for connection to the upstream-side device and at least one downstream-side port for connection to the downstream-side device. The master device includes: a topology acquisition part for acquiring topology information indicating a topology of the network system; a port control part for switching between closing and opening of the port of each slave device such that the downmost stream-side slave device is defined as a target slave device to be inspected and a serial topology is formed from the master device to the target slave device, on the basis of the topology information; a transmission and reception part for transmitting inspection data after the control by the port control part, and receiving the returned inspection data; and a determination part for detecting a connection abnormality of the target slave device on the basis of a status of return of the inspection data.

According to the master device, it also becomes possible to easily identify a position of an abnormality and to inform a user of the position. Therefore, it is possible to quickly deal with the failure.

Effect of the Invention

According to the present invention, it is possible to provide a technique of detecting a connection abnormality of a slave device, in a network system including a master device and slave devices.

MODES FOR CARRYING OUT THE INVENTION

With reference to the drawings, hereinafter, description will be given of preferred embodiments of the present invention. Each of the following embodiments describes a method of constructing a system in accordance with Ether-CAT standards; however, the present invention is not limited to such a method. The present invention is applicable to any industrial network system including a master device and slave devices and having a configuration that an information signal is transmitted from the master device, is passed through the respective slave devices, and then is returned to the master device.

(Configuration of Industrial Network System)

Figure 10:
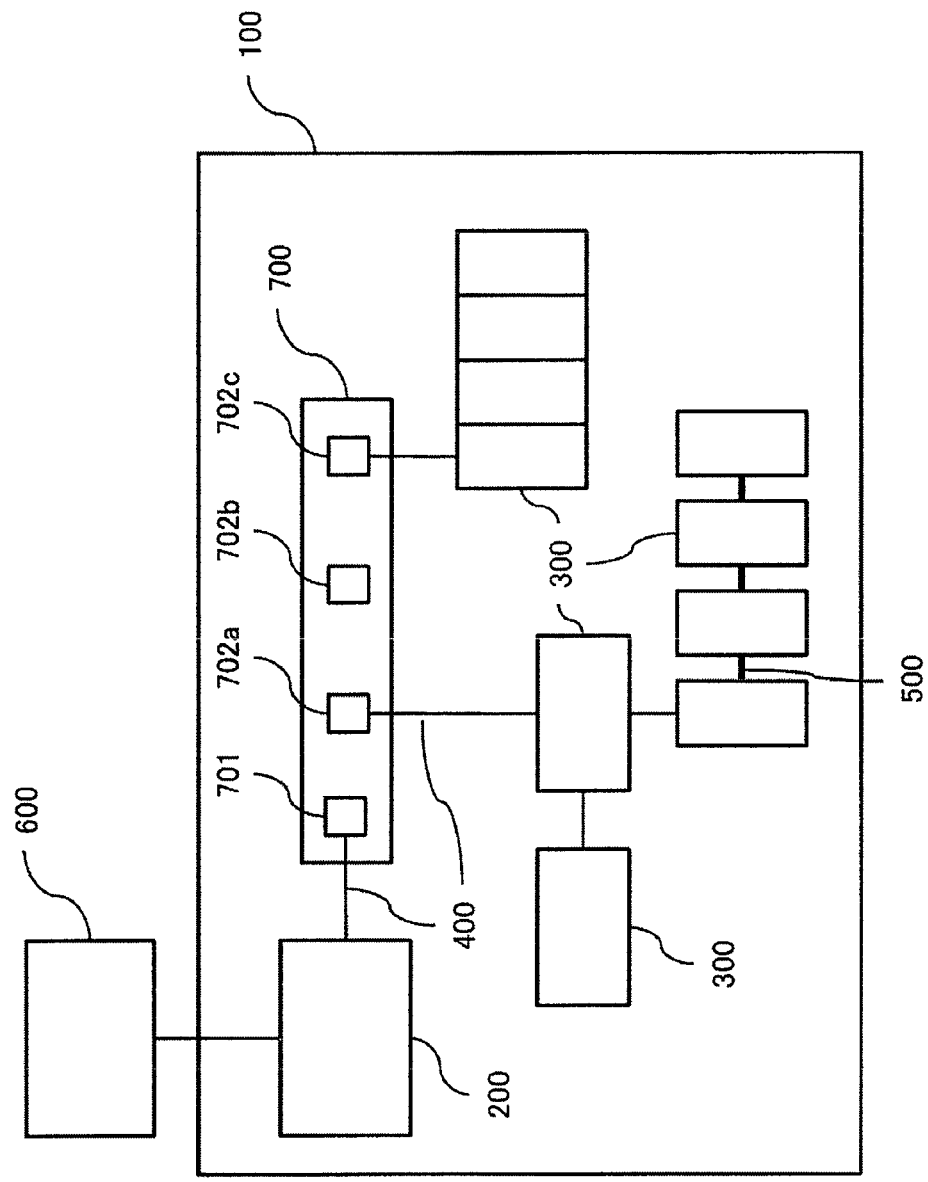
FIG. 10 is a block diagram illustrating an example of a configuration of an industrial network system.

With reference to FIG. 10, first, description will be given of an example of a configuration of an industrial network system according to the present invention. Referring to FIG. 10, an industrial network system 100 has a configuration that a master device 200 (PLC: Programmable Logic Controller) and a plurality of slave devices 300 are directly or indirectly connected via cables 400, an I/O unit 500 in the device, and a hub device 700. Examples of the slave device 300 may include a power supply unit, a motor unit, a counter unit, an image unit, a communication unit, an I/O unit and the like. Herein, an administration device 600 may be connected to the master device 200. The administration device 600 allows a user to set operations of the master device 200, display an operating status of the industrial network system 100 and design the network. The administration device 600 is configured with, for example, a personal computer in which a setting tool is installed.

The hub device 700 has one port 701 and a plurality of ports 702a to 702c. It is assumed herein that the master device is located on the upstream side. In this case, the port 701 is connected to the upstream side, and the ports 702a to 702c are each connected to the downstream side. The user can create a desired topology by connecting the respective devices using a cable and a hub device while setting an order and a branch. A branch structure is obtained by the hub device and is also obtained in such a manner that a slave device has a plurality of downstream-side ports to which different slave devices are connected, respectively.

The cable 400 to be used in the EtherCAT may be a cable used in accordance with the normal Ethernet standards or may be a cable manufactured by a facility for manufacturing Ethernet equipment. Thus, a cost reduction can be realized.

The industrial network system 100 is a network constructed in accordance with the EtherCAT standards. For example, the industrial network system 100 is laid on a factory and the like, and is utilized as an FA system. The master device 200 transmits an information signal containing control data through the network, in accordance with a program or an operation. The slave device 300 operates on the basis of the received information signal, or rewrites and returns the received information signal, as a reply to a request which is contained in the information signal and is sent from the master device. The production in the factory including the industrial network system 100 is achieved as follows. That is, all the slave devices share work in conjunction with one another in such a manner that the master device controls the details and timings of operations.

The Ethernet standards impose no restrictions to an order of arrangement of the devices in the network. The reason therefor is as follows. That is, each device has a unique physical address, such as a mac address, to be allocated irrespective of a position in the network.

According to the EtherCAT standards, on the other hand, the respective devices are located on the network on the basis of an order of connection, and the positions of the respective devices are relevant to communication between the master device and the slave device. The reason therefor is as follows. That is, the slave device has no absolute address such as a mac address, and the master device allocates an address (node address) of each slave device on the basis of a position (position address) in the network. The information signal sent from the master device is directed to all the slave devices, and each slave device reads and writes data from and into the position corresponding to the address thereof in the information signal. Accordingly, if an order of wirings for the slave devices arranged in series is different from information designed by a design assist system, a slave device which will read and write data from and into the information signal is different from an intended slave device for the master device. As the result, there is a possibility of an event that a motor and the like operate unusually because the slave device receives incorrect control data or an event that inconsistency is caused because the wrong slave device overwrites data into the information signal.

First Embodiment

A first embodiment describes a method of detecting a position of a failure by control of a master device in a case where a cable failure occurs as a connection abnormality of a slave device in a network constructed in accordance with the EtherCAT standards.
(Device Configuration)

Figure 1:
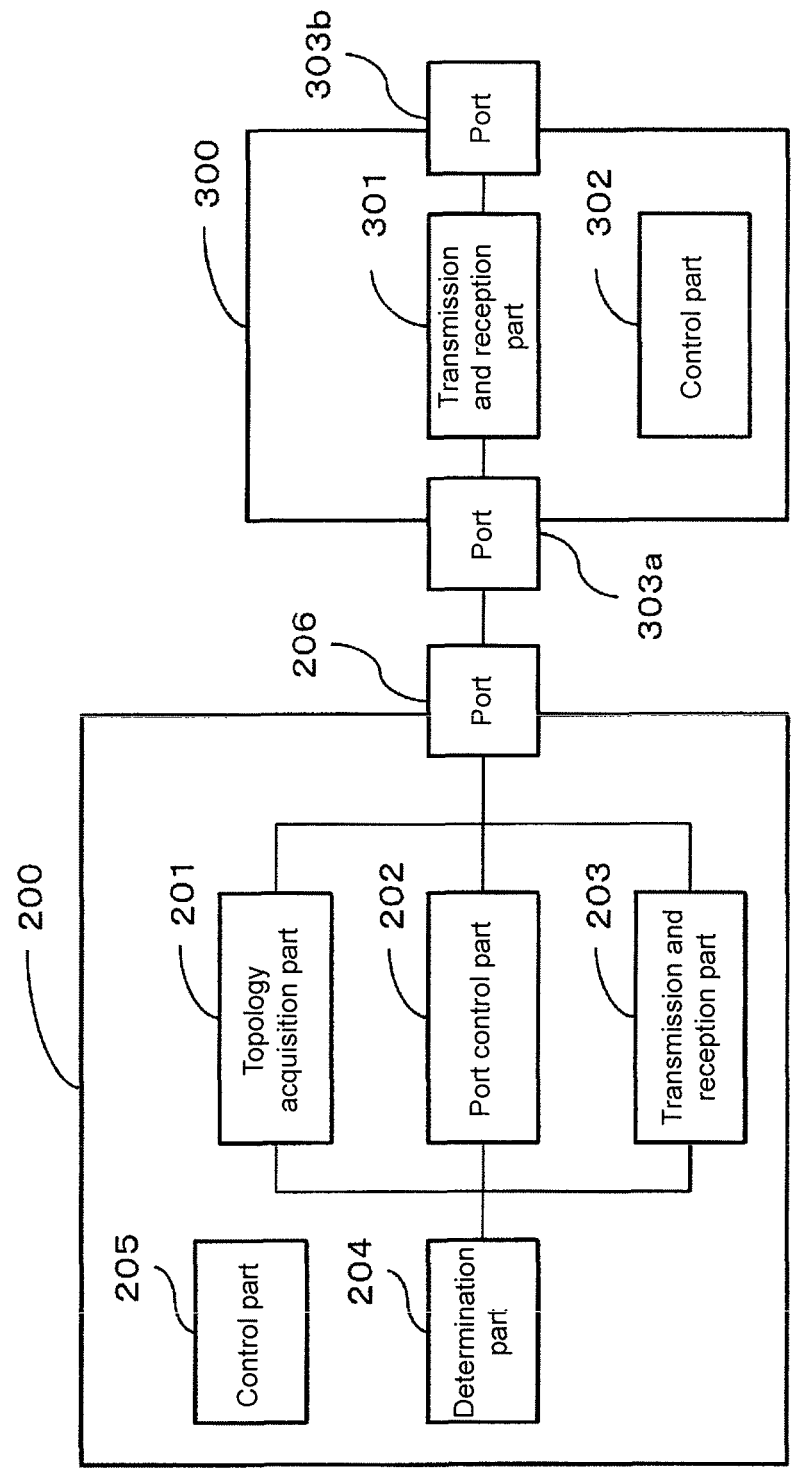
FIG. 1 is a block diagram illustrating configurations of a master device and a slave device in the present invention.
Figure 2:
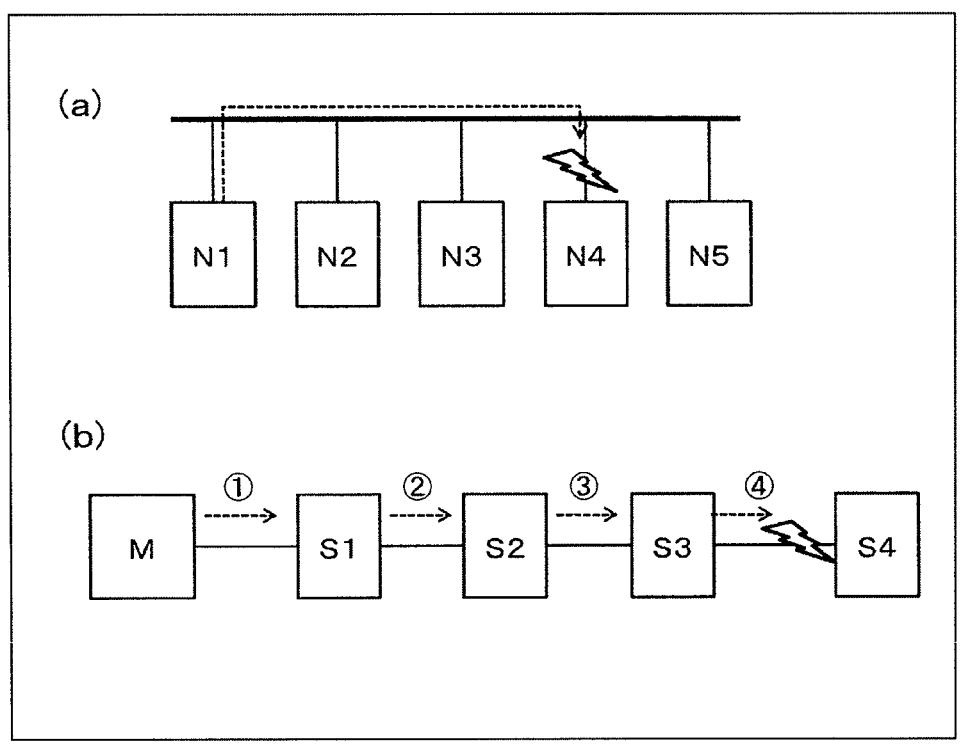
FIGS. 2(a) and 2(b) are diagrams illustrating a difference between transmission of an information signal according to the Ethernet and transmission of an information signal according to the EtherCAT.

FIG. 1 is a block diagram illustrating configurations of the master device and slave device in the first embodiment. The master device 200 includes a topology acquisition part 201, a port control part 202, a transmission and reception part 203, a determination part 204, a control part 205 and a port 206.

The topology acquisition part 201 communicates with and collects information from all the slave devices connected to the downstream side of the master device. The details of the collected information will be described later. Then, the topology acquisition part 201 interprets a current topology on the basis of the collected information. The port control part 202 instructs each slave device in the network to open or close each port. When the port of a certain slave device is closed, an information signal is not transferred to the slave devices connected to the downstream side of this port, so that the topology of the network is changed. With regard to the connection abnormality detection in this embodiment, the topology of the network is changed in a serial shape, and the downmost stream-side slave device in the serial topology is defined as a target slave device. The master device inspects the quality of a cable for connecting the target slave device to the upstream side.

The transmission and reception part 203 of the master device administers the transmission and reception of an information signal to and from the slave devices. In a test mode, particularly, the transmission and reception part 203 sends an information signal multiple times, and obtains a ratio of the returned information signals. The determination part 204 determines whether a connection abnormality occurs at the target slave device, on the basis of the current topology formed by the control to open and close the port by the port control part, and the ratio of the successful reception of the information signal by the transmission and reception part.

The control part 205 is a CPU or the like for executing a program, and controls each block in the master device by way of a control line (not illustrated). The port 206 sends an information signal from the master device to the downstream-side slave device, and receives the information signal returned from the slave device. The port used at the time of sending the information signal may be different from the port used at the time of receiving the information signal.

Each of the slave devices 300 includes a transmission and reception part 301, a control part 302, an upstream-side port 303a (IN port) and a downstream-side port 303b (OUT port). In the slave device, the transmission and reception part 301 receives an information signal from the upstream side, reads information from a position of the slave device, and rewrites the information if necessary. The control part 302 is a CPU or the like as in the master device, and controls each block in the slave device by way of a control line (not illustrated). The slave device has only one upstream-side port 303a. On the other hand, the slave device may have a plurality of downstream-side ports 303b.

FIG. 1 illustrates only one slave device. Subsequent to the downstream-side port 303b, actually, slave devices each of which is similar in configuration to the illustrated slave device are connected in a user desired topology.

In the case of designing a network in accordance with the EtherCAT standards, there is a necessity to consider a topology such as an order of connection among the slave devices, and a port number in a hub device. However, a typical user does not necessarily to have technical knowledge and experiment like a system engineer or a customer engineer. Therefore, it is preferable to provide a design assist system for facilitating the understanding of a topology with a graphical display, thereby assisting the designing work. The design assist system is provided as an administration device connected to the master device. The administration device is a personal computer or the like having installed therein a setting tool which is an application for generating setting information. The administration device allows the user to easily perform the designing work by means of input devices such as a keyboard and a mouse through a GUI displayed on the display of the administration device.
(Overall Processing Flow)

Figure 3:
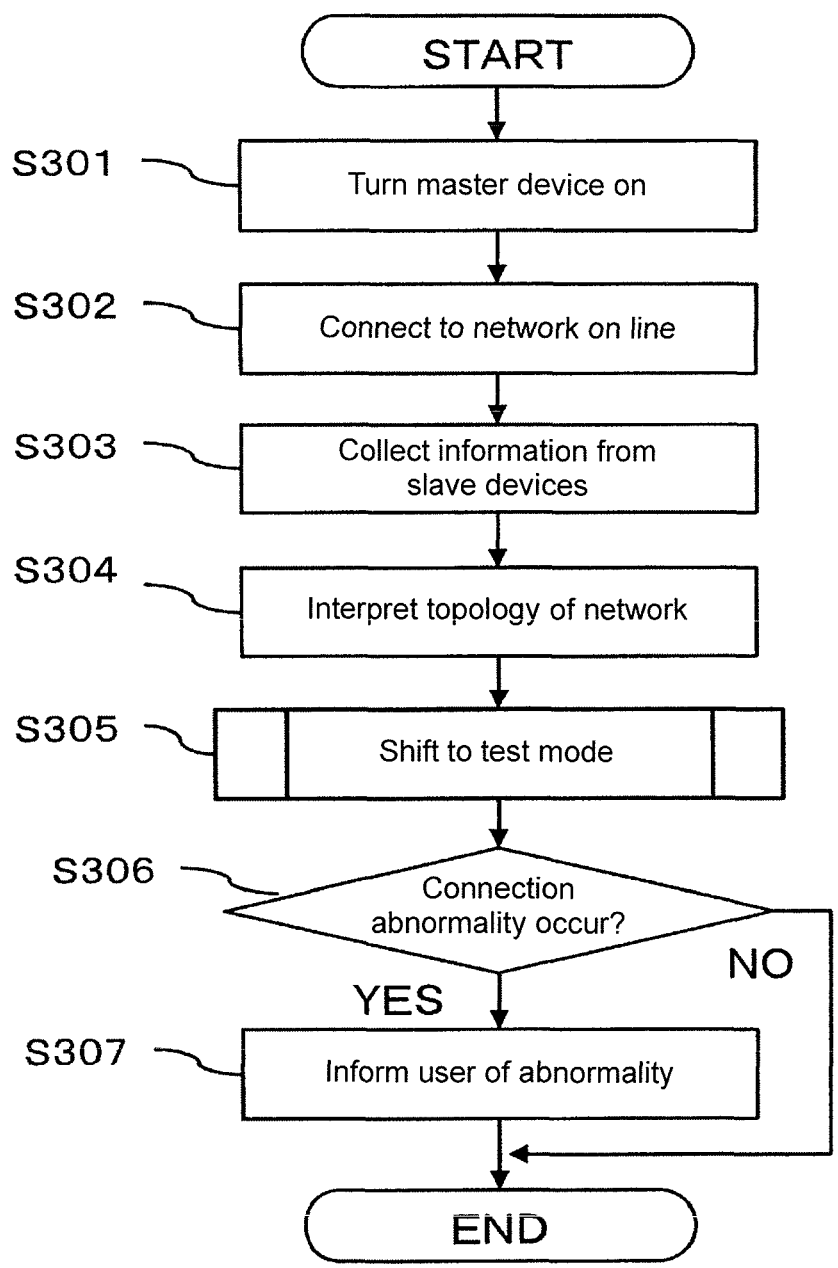
FIG. 3 is a flowchart illustrating overall processing in the present invention.

With reference to FIG. 3, first, description will be given of an overall processing flow in this embodiment. In step S301, the master device is turned on. In step S302, the master device is connected to the network on line. In the master device, the transmission and reception part 201 communicates with each slave device in the network, and collects and stores information of the slave device, via the port 206, as initial processing at the time of start-up or in accordance with explicit operation by the user (step S303). Herein, the master device accesses the slave device on the basis of an address defined in accordance with the position of each slave device on the line. Examples of the information obtained in this step may include the name of the device, the number of OUT ports and a status of the closing and opening of each port in a case where the slave device has a plurality of OUT ports, and the name of the device connected to each port.

In step S304, the topology acquisition part 201 of the master device interprets a topology of the network. Herein, the information acquired in step S303 indicates a structure that the slave devices are connected to each other via the port. Therefore, the topology can be interpreted by matching the pieces of information acquired from all the slave devices with one another and analyzing the information using a predetermined algorithm. Herein, in a case where the master device stores the topology information in advance, the master device immediately shifts to a test mode without carrying out steps S303 and S304.

In FIG. 3, step S305 corresponds to the test mode which is a feature of this embodiment. The details of this processing will be described later with reference to a different flowchart. In the test mode, the master device determines whether a connection abnormality such as a cable failure occurs at a network and, when such an abnormality occurs, detects a position of the abnormality.

When the connection abnormality occurs (YES in step S306), the master device informs the user that the connection abnormality occurs, by means of a display on the screen of the administration device, voice, lighting of an LED, and the like (step S307). From the viewpoint of assisting the understanding of the user, for example, it is preferable to display the position of the abnormality on a network topology diagram graphically displayed on the screen of the administration device. The user who has informed that the abnormality occurs can grasp the position of the abnormality, and therefore can quickly deal with the problem without requiring a time for identifying the details of the problem.

(Processing Flow in Test Mode)

Figure 4:
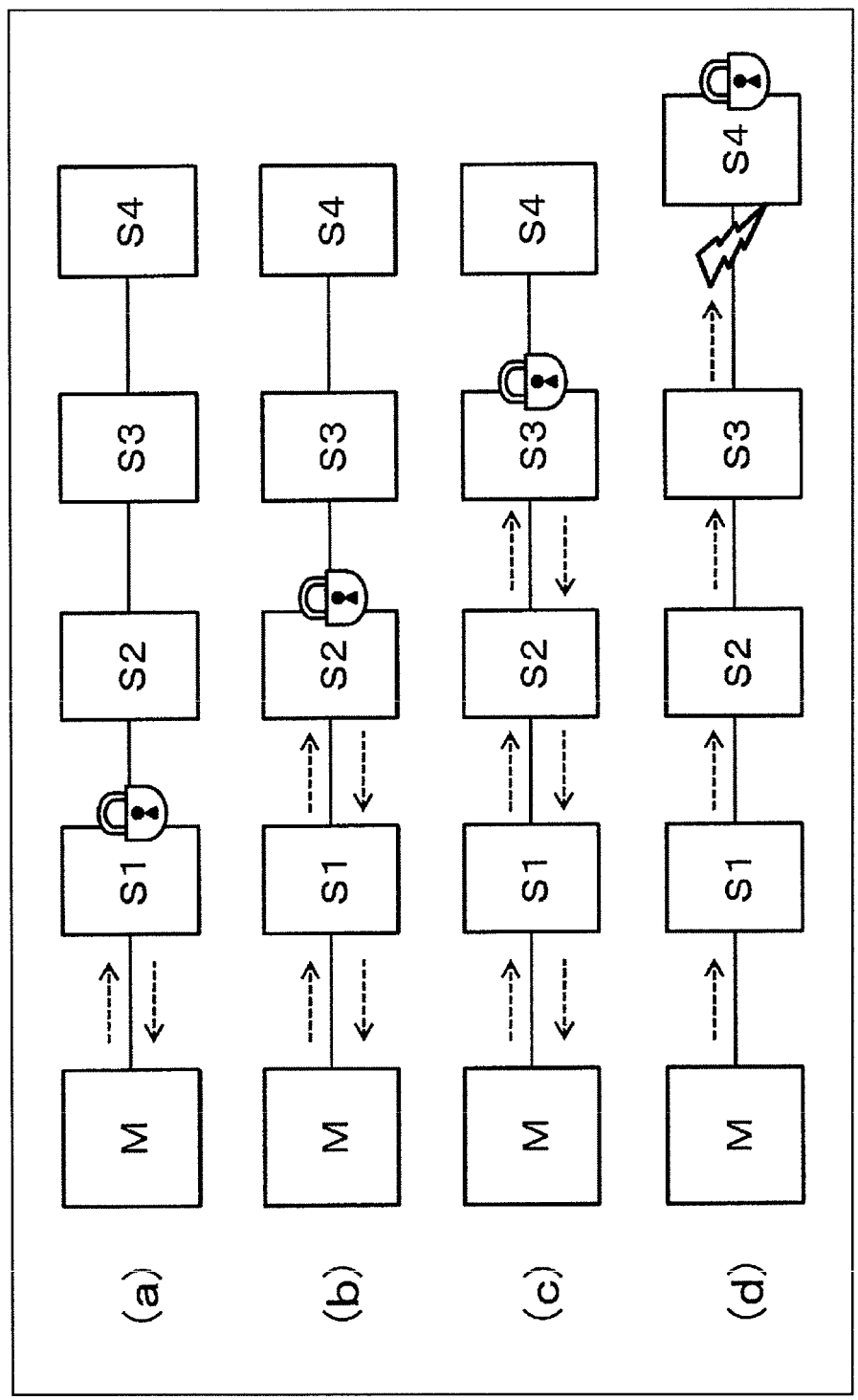
FIGS. 4(a) to 4(d) are diagrams illustrating port control in a first embodiment of the present invention.
Figure 5:
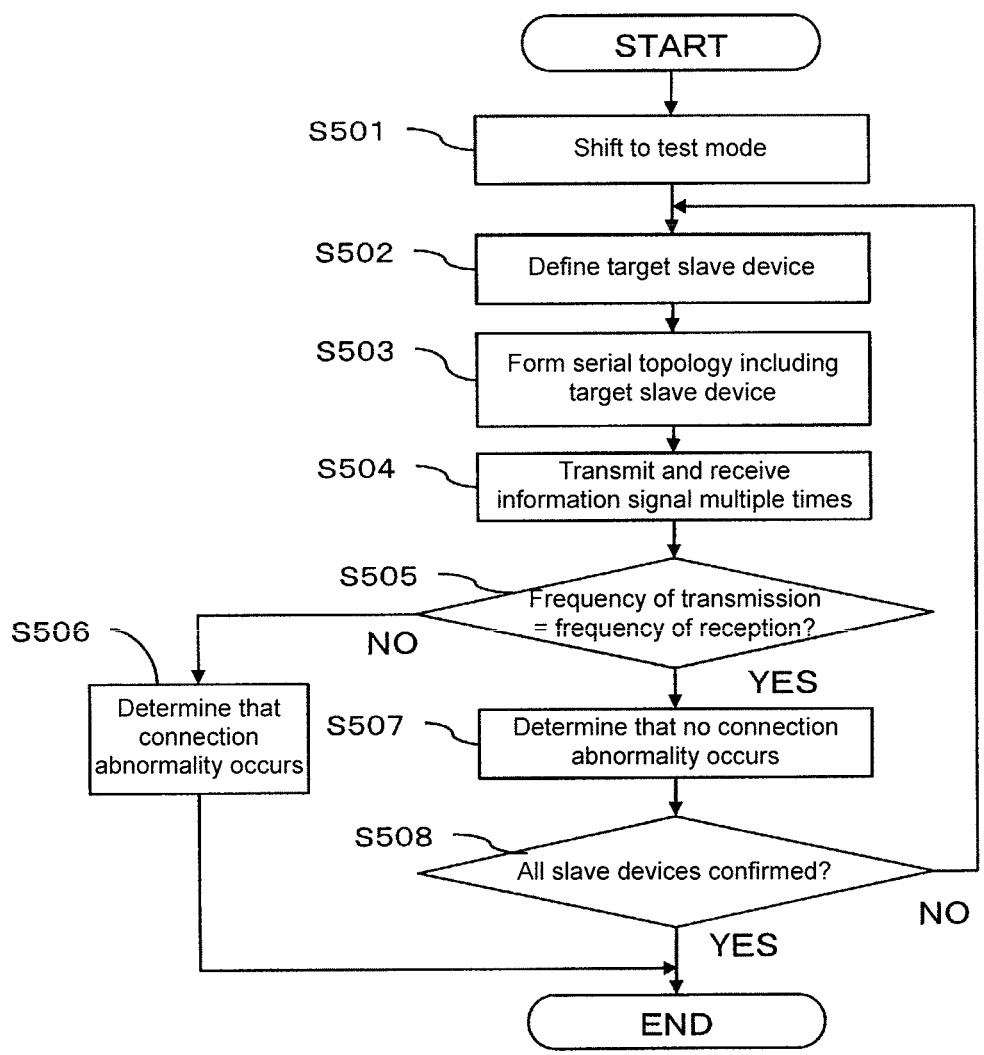
FIG. 5 is a flowchart illustrating processing in a test mode in the first embodiment of the present invention.

With reference to FIG. 5, next, detailed description will be given of a processing flow from a start to end of the test mode for connection abnormality detection. Reference is also made to FIGS. 4(a) to 4(d) each of which is a schematic diagram of the topology of the industrial network system, if necessary. At the start of the processing flow, the master device and the slave device are turned on and connected to each other. The test mode is different from the process of production in the industrial network system, and is a dedicated mode for detecting a connection abnormality. The shift to the test mode is made by the explicit operation of the user, for example, input through the GUI on the administration device connected to the master device, or physical operation of a switch, a button or the like. Alternatively, the industrial network system may shift to the test mode when the transmission of an information signal is interrupted. A series of processing in the test mode may be automatically executed by a control part and then a result thereof may be displayed. Moreover, the series of processing in the test mode may be tracked step by step while the user checks the circumstances.

In step S501, the industrial network system shifts to the test mode. Thus, the normal control using an information signal is changed to confirmation of cable connection.

In step S502, the master device defines a target slave device the status of connection of which should be confirmed. Herein, one target slave device is selected in the network. In this embodiment, particularly, a target slave device is sequentially selected from the upstream side of the network, in view of the characteristics of the EtherCAT. FIGS. 4(a) to 4(d) illustrate the state of processing in time sequence, and the slave devices S1 to S4 are sequentially selected as a target slave device.

In step S503, the port control part 202 of the master device issues instructions to close or open the port of each slave device, thereby forming a serial topology including the target slave device. In FIG. 4(a), for example, the port control part 202 closes the downstream-side port of the slave device S1 selected as the target slave device. Thus, a serial topology is formed from the master device to the slave device S1.

In step S504, the transmission and reception part 203 of the master device transmits an information signal multiple times to the target slave device and receives the returned information signal, on a trial basis. The frequency of transmitting and receiving the information signal is optionally set and is, for example, 100 in this embodiment. Next, the transmission and reception part 203 of the master device obtains a ratio of the frequency of successfully receiving the returned information signal to the frequency of transmitting the information signal (step S505).

When the frequency of successful reception is 100, it can be determined that no abnormality occurs at the connection between the master device and the target slave device (the slave device S1) (step S507). On the other hand, when the frequency of successful reception is less than 100, it is determined that an abnormality occurs at the connection between the master device and the target slave device (step S506). When the abnormality is found, the master device informs the user of the position of the abnormality and prompts the user to deal with the abnormality, as described in the overall processing flow. The information signal to be transmitted multiple times corresponds to inspection data in this embodiment.

When all the slave devices in the network are not subjected to the confirmation yet (NO in step S508), the processing returns to the step of defining a target slave device (S503), and then step S503 is executed again. FIG. 4(b) illustrates the selection of the slave device at this time. In this case, the slave device S2 located on the downstream side of the current target slave device S1 is selected as a target slave device in order to extend the topology formed as illustrated in FIG. 4(a). Then, the port control part 202 opens the downstream-side port of the previous target slave device S1, and closes the downstream-side port of the new target slave device S2. Next, the transmission and reception part 203 transmits and receives an information signal multiple times. When the frequency of transmission is equal to the frequency of reception, it is determined that no connection abnormality occurs at the slave device S2.

At this time, the connection between the slave device S1 and the slave device S2 is also determined that no abnormality occurs, in addition to the connection between the master device and the slave device S1, the connection being already determined that no abnormality occurs. Abnormality detection is sequentially performed from the upstream side as described above, so that the inspected area can be extended.

As illustrated in FIG. 4(c), next, the slave device S3 is selected as a new target slave device as in the similar manner. Herein, the downstream-side port of the slave device S3 is closed, and the slave device S3 is confirmed as to whether a problem arises upon multiple transmission and reception of an information signal.

Herein, the following assumption is made. That is, in a case where the slave device S4 is selected as a target slave device, it is determined in step S505 that the frequency of transmission is different from the frequency of reception. Examples of the case where the frequency of transmission is different from the frequency of reception may include a case where a part of the information signals is not returned, and a case where all the information signals are not returned. In any cases, it can be determined that a certain connection abnormality occurs. Moreover, there is a possibility that the seriousness of an abnormality can be determined on the basis of a ratio of the information signals which are not returned.

In this case, it is already determined that no abnormality occurs at the connection between the master device and the slave device S1, the connection between the slave device S1 and the slave device S2, and the connection between the slave device S2 and the slave device S3. Therefore, it can be determined that a cable abnormality occurs at the connection between the slave device S3 and the slave device S4 newly added to the serial topology.

As described above, even in the industrial network system in which communication designating an individual slave device is not established and an information signal passes through all the slave devices, the master device is capable of identifying a position of a failure. The passing the information to the user contributes to the quick recovery from the failure. Accordingly, it becomes possible to deal with the failure even by a user who has no technical knowledge. Thus, it is possible to provide a network that takes high stability and improvement in usability into consideration.

Second Embodiment

A second embodiment describes a method of forming a serial topology in a case where a network includes branched portions such as a hub device and a slave device having a plurality of downstream-side ports. According to this method, the connection abnormality detection method described in the first embodiment can be applied to a network having various topologies.

Figure 6:
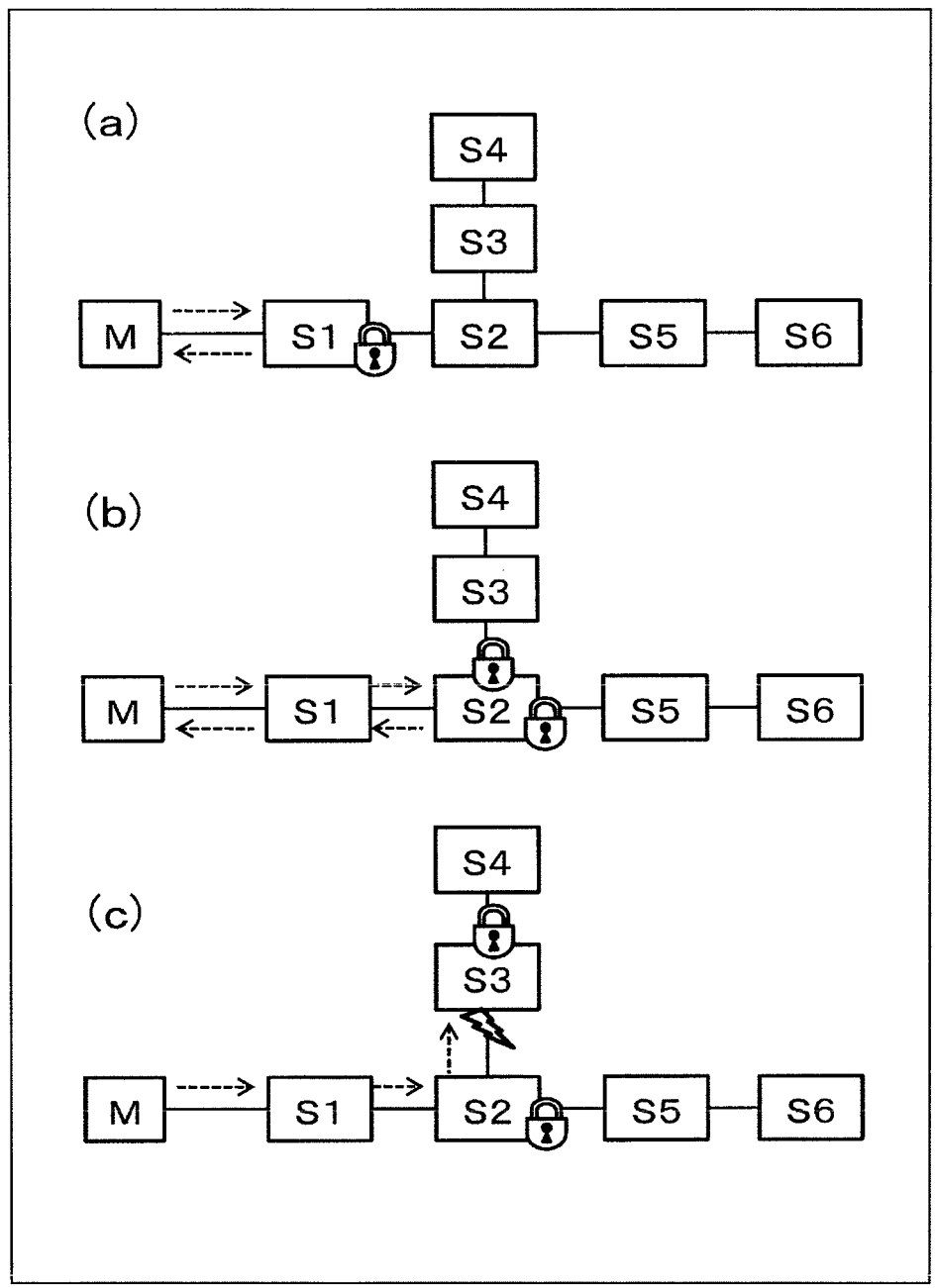
FIGS. 6(a) to 6(c) are diagrams illustrating port control in a second embodiment of the present invention.

FIGS. 6(a) to 6(c) are diagrams for illustrating the formation of a topology in this embodiment.

FIG. 6(a) illustrates a first step in detection processing. In step S502 illustrated in FIG. 5, the slave device S1 is defined as a target slave device. In step S503, a serial topology is formed in such a manner that the downstream-side port is closed and the upstream-side port is opened in the slave device S1.

When no cable abnormality is found in the formed serial topology, the processing shifts to step S502 again through a loop in the flow. FIG. 6(b) illustrates this state. Herein, the slave device S2 is defined as a target slave device. The slave device S2 has two downstream-side ports to which different slave devices are connected, respectively. That is, the downstream-side ports correspond to branched portions. When both the two ports are closed, a serial topology can be formed from the master device to the slave device S2.

Herein, when no connection abnormality is found, the slave device S3 connected to one of the branched portions is defined as a target slave device, as illustrated in FIG. 6(c). In the slave device S2, the port connected to the slave device S3 is opened and the port connected to the slave device S5 is closed. When a cable abnormality occurs at the connection between the slave device S2 and the slave device S3, the frequency of transmission of an information signal from the master device is different from the frequency of reception of the information signal by the master device. Therefore, the determination part of the master device detects occurrence of a certain abnormality.

Next, when no abnormality is found even after the inspection for the slave device S4 subsequent to the slave device S3, the different branched portion is subjected to the inspection. In the slave device S2, the port connected to the slave device S3 is closed and the port connected to the slave device S5 is opened.

A network constructed in accordance with the EtherCAT standards may have various topologies such as a topology including branched portions. Even in the network including the branched portions, however, the method of this embodiment is capable of identifying a position of an abnormality by designating the slave device sequentially from the upstream side for each branched portion and issuing to each designated slave device an instruction by the port control part.

Third Embodiment

A third embodiment describes a case where a connection abnormality to be detected is an erroneous connection of a port. That is, a port is erroneously selected at the time of connection between slave devices. Particularly, in a case where a cable is connected to the upstream side of a target slave device, the cable is not correctly connected to the IN port of the target slave device, but is erroneously connected to the OUT port of the target slave device. As the result, the cable connects between the OUT port of the upstream-side slave device and the OUT port of the target slave device. Therefore, such an erroneous connection is also called an OUT-OUT connection.

Figure 7:
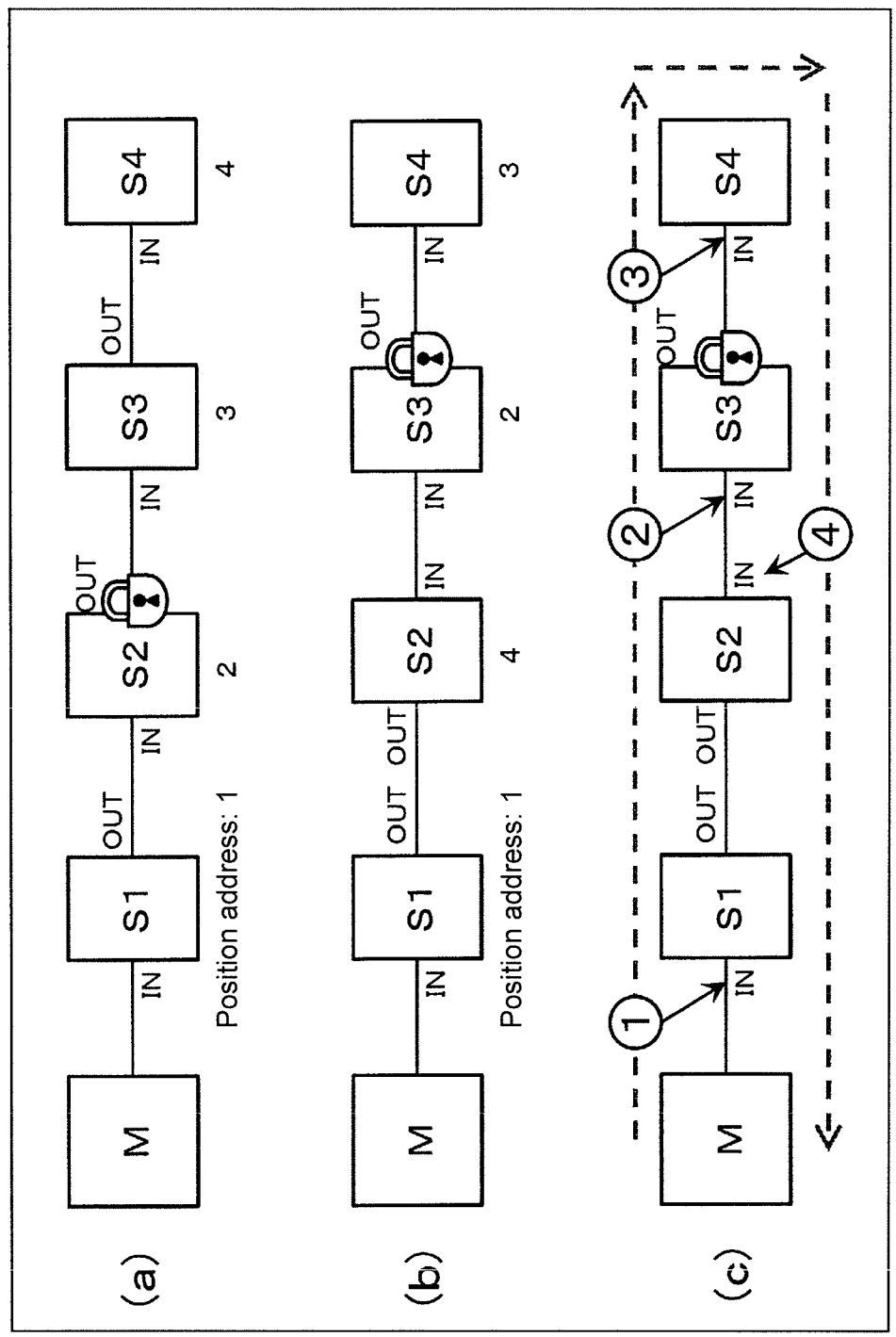
FIGS. 7(a) to 7(c) are diagrams illustrating processing in a third embodiment of the present invention.

With reference to FIGS. 7(a) to 7(c), description will be given of problems of the OUT-OUT connection. For the sake of simplification, consideration is given to a serial topology including one master device M and four slave devices S1 to S4. FIG. 7(a) illustrates a state that the IN port and the OUT port are correctly connected in the respective devices.

Herein, each slave device has allocated thereto an address (position address) based on a position thereof in the network. For example, address numbers are allocated from the upstream side to the downstream side in ascending order. That is, position address 1 is allocated to the slave device S1, and position address 2 is allocated to the slave device S2. This rule of setting the position address is merely one example, and can be appropriately changed in accordance with the industrial Ethernet standards to which the present invention is applied.

FIG. 7(b) is a schematic diagram of the OUT-OUT connection. That is, the cable extending from the OUT port of the slave device S1 is not correctly connected to the IN port of the slave device S2, but is erroneously connected to the OUT port of the slave device S2. Therefore, the IN port of the slave device S2 is connected to the downstream-side slave device S3. Herein, position address 1 is allocated to the slave device S1 as in FIG. 7(a). However, position addresses to be allocated to the slave device S2, at which the erroneous connection is established, and the slave devices subsequent thereto are different from those in FIG. 7(a).

The allocation of the position addresses depends on the EtherCAT standards. FIG. 7(c) illustrates this state. The position address of each slave device is defined on the basis of order of the slave devices in which an information signal from the master device is subjected to processing. The slave device performs various types of processing on the information signal received through the IN port thereof. Therefore, the position addresses are allocated in sequence as shown with circled numbers 1 to 4.

As described above, the erroneous port connection causes the erroneous position address allocation. As the result, in the case where the master device adds control data for each slave device to the information signal, an assumed position address is different from an actual position address. The method of easily detecting the OUT-OUT connection is required for preventing useless data transfer or unintended data overwriting which may occur because of this difference.

(Processing Flow)

Figure 8:
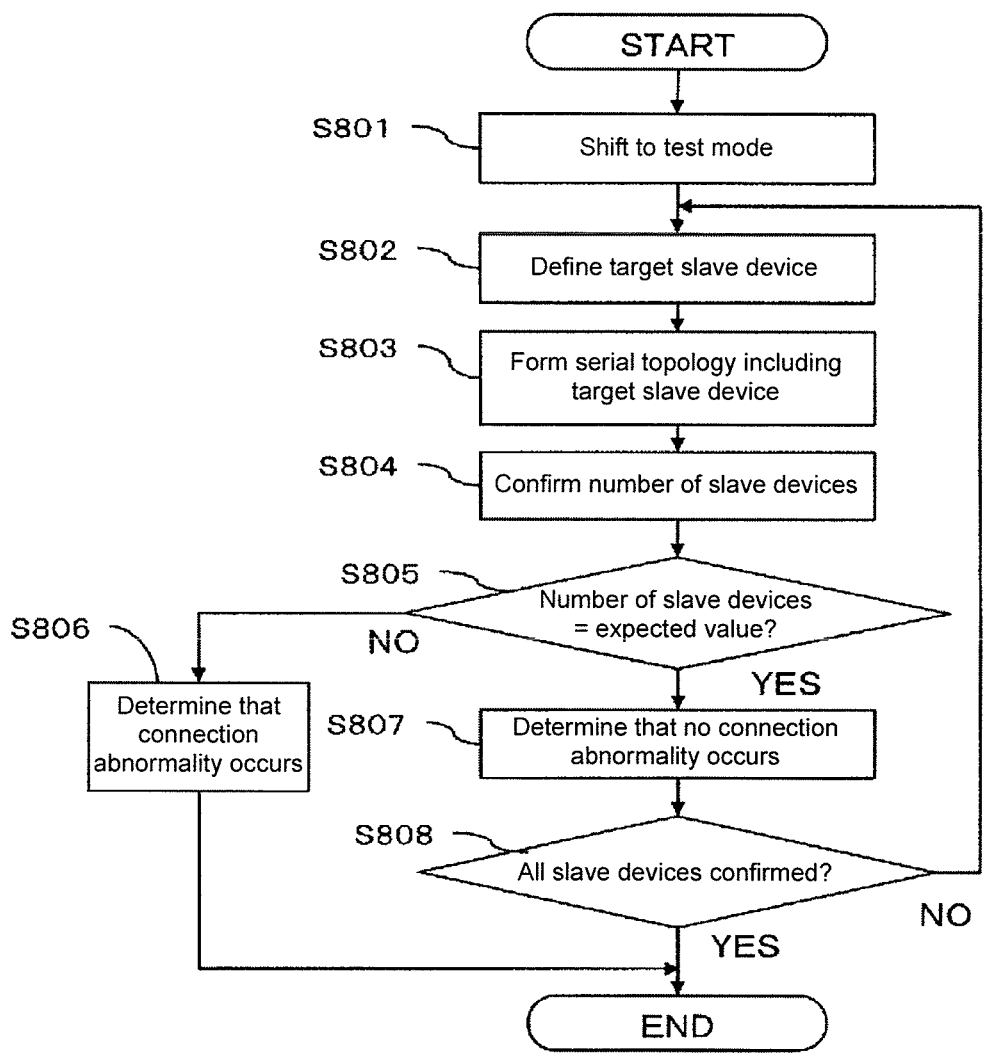
FIG. 8 is a flowchart illustrating processing in a test mode in the third embodiment of the present invention.

With reference to FIG. 8, description will be given of a processing flow in this embodiment. Reference is also made to the topologies illustrated in FIGS. 7(a) to 7(c) if necessary. Conditions at the start of the processing flow are similar to those in the first embodiment. The processing is started in a test mode where an erroneous connection occurs. For comparison, consideration is given to a behavior in a case where the inspection method in this embodiment is applied to the network in which the connection is correctly established as illustrated in FIG. 7(a) and a behavior in a case where the inspection method in this embodiment is applied to the network in which the connection is erroneously established as illustrated in FIG. 7(b).

Step S801 to S803 are similar in details of processing to step S501 to S503 illustrated in FIG. 5. In step S801, the network system shifts to the test mode. In step S802, the master device defines a target slave device. The target slave device is sequentially selected from the upstream side of the network as in the first embodiment.

In step S803, the port control part of the master device issues an instruction to close or open the port of each slave device, so that a serial topology is formed from the master device to the target slave device. Herein, the master device uses information obtained by interpreting the topology in the overall processing flow. It is noted herein that the master device issues an instruction to designate a position address of the slave device in order to close the port of the slave device.

In step S804, the transmission and reception part 203 of the master device issues a command to confirm the number of slave devices with regard to all the slave devices in the current topology of the network. As described above, the information signal based on the EtherCAT is returned to the master device via all the slave devices. Accordingly, the number of slave devices can be confirmed in such a manner that the slave device which receives the information signal increments a predetermined variable by one. This information signal corresponds to inspection data in this embodiment.

First, consideration is given to the serial topology in which the connection is correctly established between the master device and the slave device S2 as illustrated in FIG. 7(a). The master device designates the slave device having position address 2 and closes the OUT port of the slave device, so that the serial topology is formed. Herein, the master device sets at 2 an expected value of the number of slave devices. When the command in step S804 is executed in the network, each of the slave devices S1 and S2 increments the variable. Thus, the master device determines that the number of slave devices is two. Accordingly, since the expected value is equal to the number of slave devices (YES in step S805), the master device determines that no connection abnormality occurs.

Next, consideration is given to the serial topology in which the OUT-OUT connection is established between the slave device S1 and the slave device S2 as illustrated in FIG. 7(b). As in the case described above, the master device designates the slave device having position address 2 and closes the OUT port of the slave device, so that the serial topology is formed. Herein, the master device sets at 2 the expected value of the number of slave devices, as in the case described above. On the other hand, when the command in step S804 is executed in the network, each of the slave devices S1, S2 and S3 increments the variable. Thus, the master device determines that the number of slave devices is three. Accordingly, since the expected value is different from the number of slave devices (NO in step S805), the master device determines that a connection abnormality occurs.

According to the connection abnormality detection method of this embodiment, it is possible to detect the state that the OUT-OUT connection is established between the slave devices in such a manner that the master device issues an instruction to close or open the port, and transmits a command in the test mode. Therefore, even in the case of an erroneous connection, it becomes possible to quickly identify a position of the failure by operations of the administration device or the like. Thus, it is possible to realize the stable operation of the network system and the improvement in usability.

Moreover, even in the case where the industrial network system has the topology including the branched portions, it is possible to apply the connection abnormality detection method of this embodiment by appropriately closing and opening the port of each slave device.

Fourth Embodiment

Figure 9:
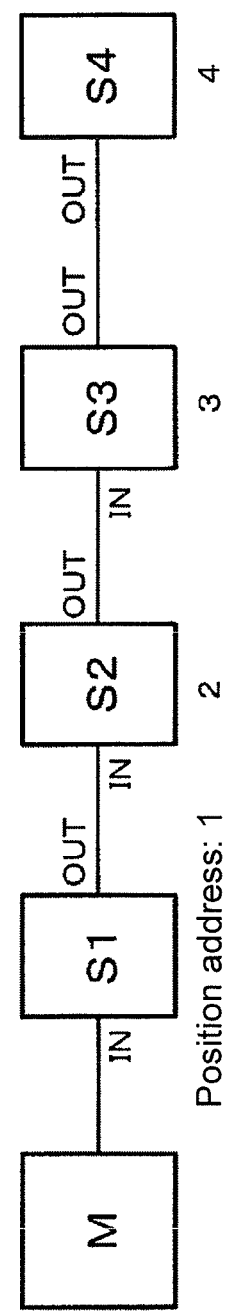
FIG. 9 is a diagram illustrating processing in a fourth embodiment of the present invention.

A fourth embodiment describes a method of detecting an OUT-OUT connection established at a slave device on the terminal end of the industrial network system, i.e., at the downmost stream-side slave device. FIG. 9 illustrates the state of the target slave device in this embodiment. For the sake of simplification, it is assumed herein that the network is constructed by connecting the master device and the slave devices S1 to S4 in series. Herein, the connection is correctly established from the master device to the slave device S3. However, the cable extending from the OUT port of the slave device S3 is connected to the OUT port of the slave device S4, so that the erroneous connection is established.

As described in the third embodiment, the position address of each slave device is defined on the basis of an order of the slave device processing an information signal. Therefore, position addresses 1 to 4 are allocated to the slave devices S1 to S4, respectively. In the third embodiment, the OUT-OUT connection is detected by the comparison between the expected value of the number of devices in the serial topology formed by the port control part of the master device and the number of devices, the number being confirmed by the command sent from the transmission and reception part of the master device. In this embodiment, however, even when the method of the third embodiment is implemented with the erroneously connected slave device S4 defined as a target slave device, the connection abnormality cannot be detected because the number of slave devices is equal to the expected value.

This erroneously connected state may cause problems of control data if being left. In a case of connecting a different slave device to the downstream side of the slave device S4, there is a possibility that the user connects the cable to the open IN port rather than the closed OUT port. Hence, there is required a method capable of detecting an OUT-OUT connection even in the case of this embodiment.

According to this embodiment, it is possible to detect the OUT-OUT connection established on the downmost stream-side slave device of the network system in such a manner that the master device makes a determination on the basis of information collected from the slave device. That is, the master device acquires a connection status of each port of the slave device, as the information to be collected from the slave device. When it is understood from the collected information that a slave device is connected to only the OUT port of the slave device S4, it can be determined that the OUT-OUT connection is established between the slave device S3 and the slave device S4. Alternatively, the master device may collect information anew in order to detect a connection abnormality of the downmost stream-side slave device of the network system.

According to the connection abnormality detection method of this embodiment, it is possible to detect the OUT-OUT connection established at the slave device on the terminal end of the network system and prompt the user to deal with the connection abnormality.

Fifth Embodiment

Figure 11:
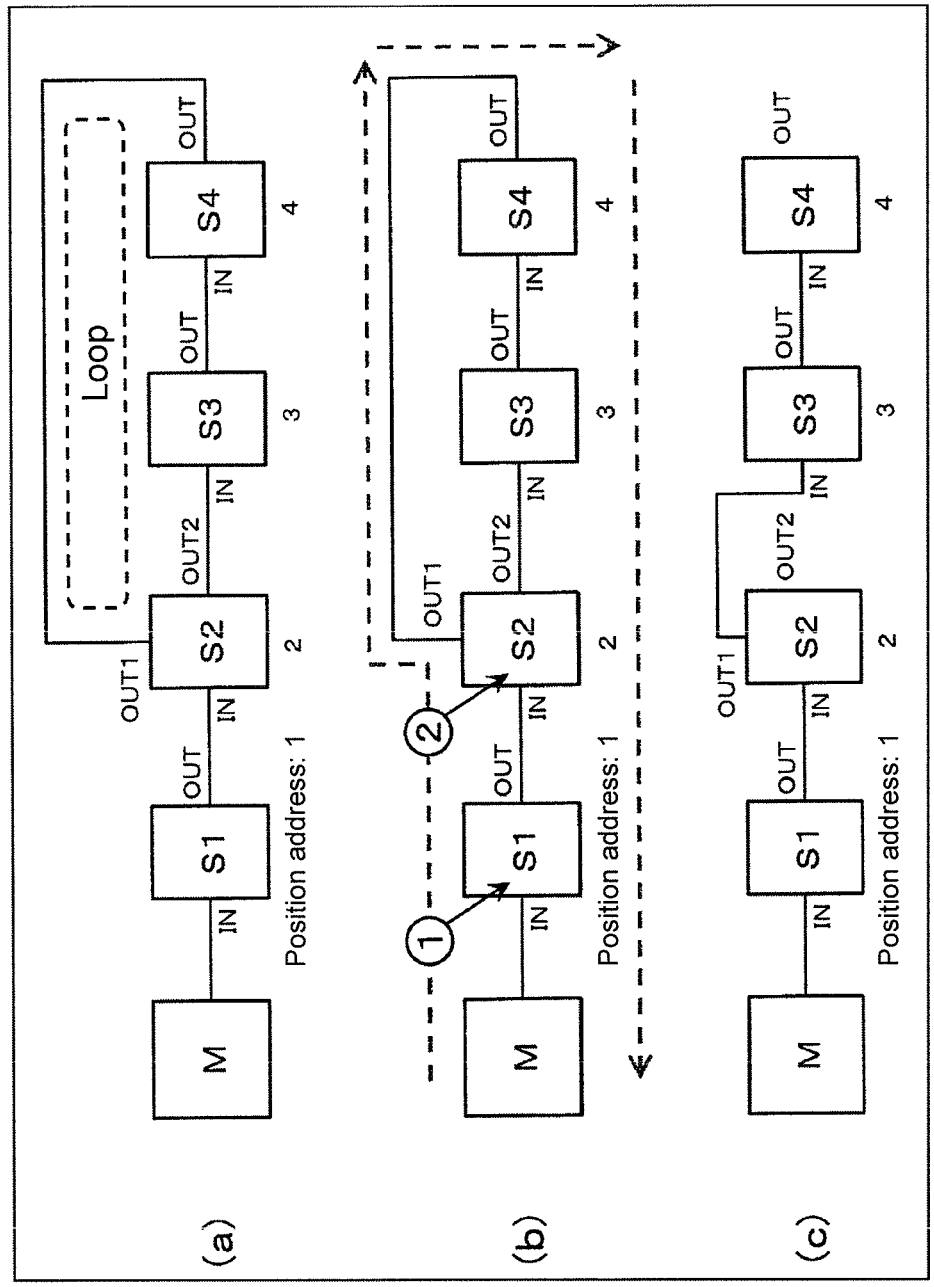
FIGS. 11(a) to 11(c) are diagrams illustrating processing in a fifth embodiment of the present invention.

A fifth embodiment describes a case where a connection abnormality to be detected is a loop connection in the network. FIG. 11(a) illustrates the state of the loop connection. The illustrated network includes one master device and four slave devices S1 to S4 which are connected in series. The slave device S2 has one IN port and two OUT ports. The two OUT ports of the slave device are called a first OUT port (OUT1 port) and a second OUT port (OUT2 port), respectively.

As illustrated in FIG. 11(a), the OUT2 port of the slave device S2 is connected to the IN port of the slave device S3. Moreover, the OUT1 port of the slave device S2 is connected to the OUT port of the slave device S4 on the terminal end of the network. The loop connection corresponds to the state that the route from the slave device S2 to the slave device S4 is a circulated route rather than a normal unicursal route.

In the EtherCAT standards, the anteroposterior relation at the time of sending information is fixed in the case where a slave device has two OUT ports. In a normal network (including no loop connection), an information signal is inputted to an IN port of a slave device, and then is transferred to the downstream side. Herein, the information signal is outputted from an OUT1 port of the slave device. The information signal is returned to the slave device along a unicursal route, and then is outputted from an OUT2 port of the slave device.

With reference to FIG. 11(b), consideration is given to a problem which may arise in a case where the network includes the loop connection. The information signal sent from the master device travels along a route shown with dotted arrow marks. That is, the information signal passes through the slave device S1, and then reaches the slave device S2. Thereafter, the information signal enters the slave device S4 through the OUT1 port having higher priority. Then, the information signal passes through the slave device S3, the slave device S2 and the slave device S1 in this order.

Herein, only the slave devices S1 and S2 (corresponding to circled numbers 1 and 2) receive the information signal. On the other hand, the slave devices S3 and S4 do not receive the information signal. The reason therefor is as follows. That is, the slave device receives only the information signal inputted thereto through the IN port. As the result, the master device fails to issue instructions to the slave devices S3 and S4, so that the operations in network, such as the process of production, are not performed correctly. Accordingly, there has been required to detect a loop connection in a network.

(Processing Flow)

Figure 12:
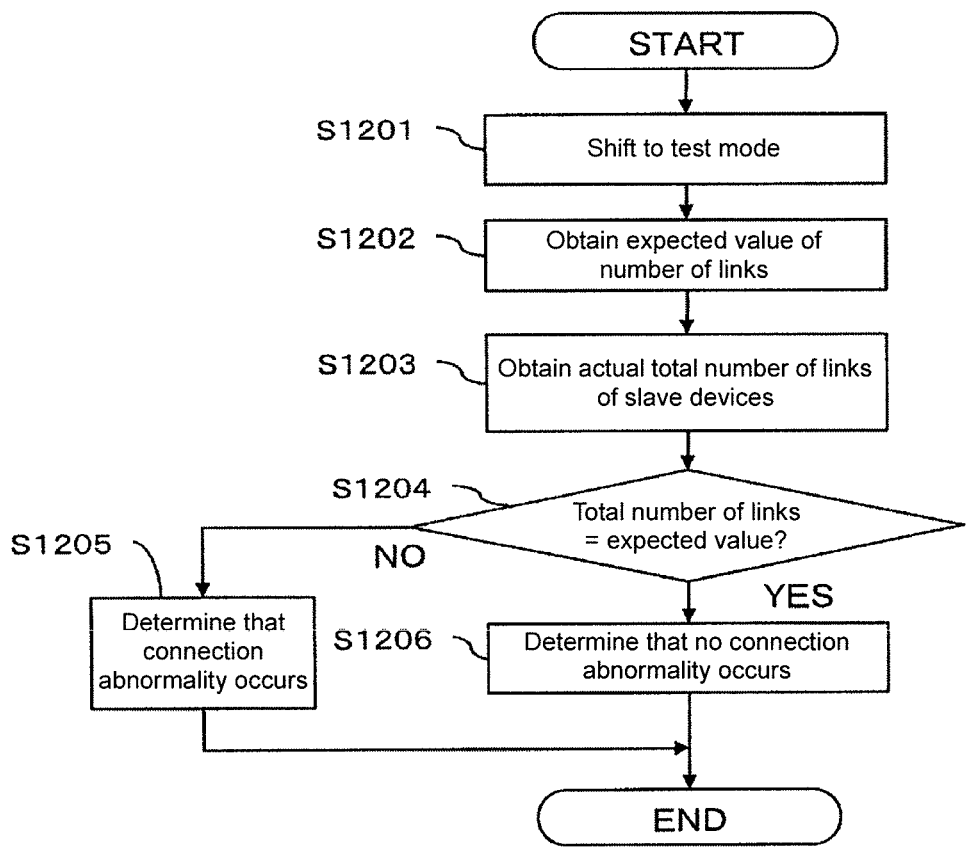
FIG. 12 is a flowchart illustrating processing in a test mode in the fifth embodiment of the present invention.

With reference to a flowchart of FIG. 12, description will be given of the processing at the time of detecting the loop connection as a connection abnormality. This processing is described as one example of the test mode in step S305 illustrated in FIG. 3. In actual, however, the loop connection can be detected at a desired timing.

In step S1201, the network system shifts to the test mode. In step S1202, next, the master device obtains an expected value of the number of links of the slave devices in the network. The number of links corresponds to the number of ports connected to different devices with cables, and the different devices to be connected may include the master device. However, the port of the master device is not included in the number of links. Herein, the expected value Lexp of the number of links is expressed by the following formula (1). In this formula, Snum represents the number of slave devices.

$$L\text{exp} = ((S\text{num} - 1) \times 2) + 1 \quad (1)$$

In step S1203, the master device obtains the actual total number of links of the slave devices. The actual total number of links can be obtained on the basis of the information collected in step S303 illustrated in FIG. 3. That is, since the status of the connected device is grasped for each port of the slave device, the total number of links is obtained by summing the ports.

In step S1204, the master device compares the expected value of the number of links with the actual number of links. When the expected value is different from the actual number (NO in S1204), the master device determines that a connection abnormality, i.e., a loop connection in this embodiment occurs. On the other hand, when the expected value is equal to the actual number (YES in S1204), the master device determines that a connection is correctly established. Then, the processing returns to step S306 illustrated in FIG. 3. In step S306, the master device informs the user of the loop connection by an arbitrary method, and prompts the user to deal with the loop connection.

(Method of Obtaining the Number of Links)

Next, specific description will be given of the processing in steps S1202 to S1204.

First, the expected value of the number of links is obtained in the network configuration described in this embodiment. In this embodiment, the number of slave devices is four. Herein, this value is substituted into the formula (1):

$$L\text{exp} = ((4-1) \times 2) + 1 = 7$$

Thus, the expected value is 7.

With reference to FIG. 11(c), herein, consideration is given to the actual total number of links in the network where no loop connection is established. In FIG. 11(c), the cable connections are correctly established, and no loop connection is established. Herein, the number of links is two as to the slave devices S1, S2 and S3 and one as to the slave device S4, that is, seven in total.

Accordingly, the expected value is equal to the actual total number of links, so that the master device determines that no connection abnormality occurs.

Next, consideration is given to the case illustrated in FIG. 11(a), that is, the case where the loop connection is established. In this case, the number of slave devices is four. However, the information signal is not received as to the slave devices S3 and S4 where the loop connection is established. Therefore, the master device determines that two slave devices are connected. At the time when the number of slave devices is two, the expected value of the number of links is two as to the slave device S1 and one as to the slave device S2, that is, three in total. On the other hand, the actual number of links is two as to the slave device S1 and three as to the slave device S2, that is, five in total.

Accordingly, the expected value is different from the actual total number of links, so that the master device determines that a connection abnormality occurs.

According to the connection abnormality detection method of this embodiment, as described above, the master device is capable of detecting the loop connection in the network by verifying the number of links of the slave devices in the test mode. When the loop connection is detected, the master device is capable of informing the user of the loop connection, thereby prompting the user to quickly deal with this failure. As the result, it is possible to contribute to the correct control of the process of production and the stable operations.

Moreover, this embodiment describes the structure that the master device and the slave devices are connected in series. Even in the case of a topology having branched portions, however, it is possible to detect the connection abnormality by the comparison between the expected value of the number of links and the actual total number of links.

In order to accomplish the object described above, a first aspect of the present invention is directed to a connection abnormality detection method in a network system including a master device and a plurality of slave devices and having configurations that data is transmitted from the master device, is sequentially passed from the upmost stream-side slave device to the downmost stream-side slave device, and then is returned to the master device, and each slave device has a plurality of ports including an upstream-side port for connection to the upstream-side device and at least one downstream-side port for connection to the downstream-side device. The connection abnormality detection method includes: an acquisition step of acquiring topology information indicating a topology of the network system, in the master device; a port control step of switching between closing and opening of the port of each slave device such that the downmost stream-side slave device is defined as a target slave device to be inspected and a serial topology is formed from the master device to the target slave device, on the basis of the topology information, in the master device; a transmission step of transmitting inspection data after the port control step, in the master device; and a detection step of detecting a connection abnormality of the target slave device on the basis of a status of return of the inspection data, in the master device.

According to the connection abnormality detection method, it is possible to confirm a connection abnormality by identifying a target slave device and then transmitting and receiving inspection data even in such a network system that data from a master device passes through all slave devices included in a topology. As the result, it becomes possible to easily identify a position of the abnormality and to inform a user of the position. Therefore, it is possible to quickly deal with the failure.

A second aspect of the present invention is directed to the connection abnormality detection method according to the first aspect, in which: when the connection abnormality of the target slave device is not detected in the detection step, the master device carries out the port control step with the slave device connected to the downstream-side port of the target slave device defined as a new target slave device.

According to the connection abnormality detection method, it is possible to inspect the slave device in the network system one by one from the upstream-side device to the downstream-side device. Accordingly, it is possible to extend the inspected area little by little. Herein, when the connection abnormality is detected in the case of carrying out the detection step again, the newly extended portion in the area to be inspected can be explicitly determined as the cause of abnormality. Therefore, it is possible to contribute to the quick identification of the position of the failure.

A third aspect of the present invention is directed to the connection abnormality detection method according to the first or second aspect, in which: when the topology of the network system includes branched portions, the master device selects one of the branched portions to form the serial topology in the port control step.

According to the connection abnormality detection method, even in the case where the branched portions are formed, it is possible to form the serial topology by selecting one of the branched portions to allow the communication between the master device and the slave device and closing the remaining branched portions. Moreover, it is possible to inspect all the slave devices in the network system by changing the branched portion to be selected in the case where no connection abnormality occurs at the selected branched portion.

A fourth aspect of the present invention is directed to the connection abnormality detection method according to any one of the first to third aspects, in which: the slave devices are connected to one another with cables; in the transmission step, the master device transmits inspection data multiple times to the target slave device; and in the detection step, the master device determines that an abnormality occurs at the cable for connecting the target slave device when the frequency of receiving the returned inspection data is smaller than the frequency of transmitting the inspection data in the transmission step.

According to the connection abnormality detection method, it is possible to determine whether the failure occurs at the cable for connecting the slave device, by inspecting the number of pieces of inspection data which are not returned, as to the inspection data transmitted to the slave device.

A fifth aspect of the present invention is directed to the connection abnormality detection method according to any one of the first to third aspects, in which: the topology information acquired by the master device in the acquisition step contains a position address defined on the basis of an order of connection of each slave device and a type of the port used for connection between the slave devices; the inspection data transmitted from the master device in the transmission step is data for confirming the number of slave devices in the serial topology formed in the port control step; and in the detection step, the master device determines that a connection abnormality corresponding to erroneous selection of one of the upstream-side port and the downstream-side port of the target slave device occurs, when there is a difference between an expected value of the number of devices including the target slave device, the expected value being obtained from the topology information and the position address, and the number of devices, the number being confirmed on the basis of the returned inspection data.

According to the connection abnormality detection method, it is possible to detect the wrong allocation of the position address due to the erroneous selection of one of the upstream-side port and the downstream-side port of the slave device. Therefore, it is possible to identify the position of the connection abnormality with the master device.

A sixth aspect of the present invention is directed to the connection abnormality detection method according to the fifth aspect, in which: when the target slave device is on the downmost stream side of the network system, the topology information acquired by the master device in the acquisition step contains a status of connection of each port of the target slave device to a different device; and when the different device is connected to only the upstream-side port among the ports of the target slave device, the master device determines that that the connection abnormality corresponding to the erroneous selection of one of the upstream-side port and the downstream-side port of the target slave device occurs in the detection step.

According to the connection abnormality detection method, it is possible to detect the erroneous selection of one of the upstream-side port and the downstream-side port even in the case where the connection abnormality is not detected by the comparison between the expected value of the number of slave devices including the target slave device and the number of devices, the number being confirmed on the basis of the inspection data, in accordance with the fifth aspect.

A seventh aspect of the present invention is directed to a network system including: a master device; and a plurality of slave devices. Herein, data is transmitted from the master device, is sequentially passed from the upmost stream-side slave device to the downmost stream-side slave device, and then is returned to the master device. Moreover, each slave device has a plurality of ports including an upstream-side port for connection to the upstream-side device and at least one downstream-side port for connection to the downstream-side device. Further, the master device includes a topology acquisition part for acquiring topology information indicating a topology of the network system, a port control part for switching between closing and opening of the port of each slave device such that the downmost stream-side slave device is defined as a target slave device to be inspected and a serial topology is formed from the master device to the target slave device, on the basis of the topology information, a transmission and reception part for transmitting inspection data after the control by the port control part, and receiving the returned inspection data, and a determination part for detecting a connection abnormality of the target slave device on the basis of a status of return of the inspection data.

According to the network system, it also becomes possible to easily identify a position of an abnormality and to inform a user of the position. Therefore, it is possible to quickly deal with the failure.

An eighth aspect of the present invention is directed to a master device in a network system including the master device and a plurality of slave devices and having configurations that data is transmitted from the master device, is sequentially passed from the upmost stream-side slave device to the downmost stream-side slave device, and then is returned to the master device, and each slave device has a plurality of ports including an upstream-side port for connection to the upstream-side device and at least one downstream-side port for connection to the downstream-side device. The master device includes: a topology acquisition part for acquiring topology information indicating a topology of the network system; a port control part for switching between closing and opening of the port of each slave device such that the downmost stream-side slave device is defined as a target slave device to be inspected and a serial topology is formed from the master device to the target slave device, on the basis of the topology information; a transmission and reception part for transmitting inspection data after the control by the port control part, and receiving the returned inspection data; and a determination part for detecting a connection abnormality of the target slave device on the basis of a status of return of the inspection data.

According to the master device, it also becomes possible to easily identify a position of an abnormality and to inform a user of the position. Therefore, it is possible to quickly deal with the failure.

DESCRIPTION OF SYMBOLS

200: Master device, 201: Topology acquisition part, 202: Port control part, 203: Transmission and reception part, 204: Determination part, 300: Slave device, 301: Transmission and reception part, 303a: Upstream-side port, 303b: Downstream-side port

The invention claimed is:

1. A connection abnormality detection method in a network system comprising a master device and a plurality of slave devices and having a configuration that data is transmitted from the master device, is sequentially passed from an upmost stream-side slave device to a downmost stream-side slave device, and then is returned to the master device, and each slave device has a plurality of ports including an upstream-side port for connection to an upstream-side device and at least one downstream-side port for connection to a downstream-side device, the connection abnormality detection method comprising:
acquiring, by the master device, topology information indicating a topology of the network system, the topology information containing a position address of each slave device, defined on the basis of an order of connection of each slave device and a type of each port used for connection between the slave devices, the type of each port including at least an input port and an output port, wherein the position address is allocated to each slave device based on an order that the slave device receives a signal output from the master device via the input port of the slave device;
switching, by the master device, between closing and opening of each port of each slave device, such that the downmost stream-side slave device is defined as a target slave device to be inspected and a serial topology is formed from the master device to the target slave device, on the basis of the topology information;
transmitting, by the master device, inspection data after the switching, and receiving returned inspection data, the inspection data including a value counting a number of slave devices in the serial topology formed in the switching;
increasing, by each slave device in the serial topology formed in the switching, the value in the inspection data, when each slave device receives the inspection data; and
detecting, by the master device, a connection abnormality of the target slave device on the basis of a status of return of the inspection data,
wherein the master device determines, in the detecting the connection abnormality, that the connection abnormality corresponding to erroneous selection of one of the input port and the output port of the target slave device occurs, when an expected value of the number of devices including the target slave device is different from the counted value of the number of slave devices in the returned inspection data, the expected value being obtained based on the position address.

2. The connection abnormality detection method according to claim 1, wherein:
when the target slave device is on the downmost stream side of the network system, the topology information acquired by the master device in the acquiring the topology information contains a status of connection of each port of the target slave device to a different device of the master device and the plurality of slave devices in the network system; and
when the different device is connected to only the output port of the ports of the target slave device, the master device determines that the connection abnormality corresponding to the erroneous selection of one of the upstream-side port and the downstream-side port of the target slave device occurs, in the detecting the connection abnormality.

3. A network system comprising:
a master device; and
a plurality of slave devices, wherein:
data is transmitted from the master device, is sequentially passed from an upmost stream-side slave device to a downmost stream-side slave device, and then is returned to the master device;
each slave device has a plurality of ports including an upstream-side port for connection to an upstream-side device and at least one downstream-side port for connection to a downstream-side device;
the master device comprises a processor that, when executing a program, performs operations comprising:
acquiring topology information indicating a topology of the network system, the topology information containing a position address of each slave device, defined on the basis of an order of connection of each slave device and a type of each port used for connection between the slave devices, the type of each port including at least an input port and an output port, wherein the position address is allocated to each slave device based on an order that the slave device receives a signal output from the master device via the input port of the slave device,
switching between closing and opening of each port of each slave device, such that the downmost stream-side slave device is defined as a target slave device to be inspected and a serial topology is formed from the master device to the target slave device, on the basis of the topology information,
transmitting inspection data after the switching, and receiving returned inspection data, the inspection data including a value counting a number of slave devices in the serial topology formed in the switching, and
detecting a connection abnormality of the target slave device on the basis of a status of return of the inspection data;
wherein each slave device in the serial topology formed in the switching, increases the value in the inspection data, when each slave device receives the inspection data,
wherein the master device determines, in the detecting the connection abnormality, that the connection abnormality corresponding to erroneous selection of one of the input port and the output port of the target slave device occurs, when an expected value of the number of devices including the target slave device is different from the counted value of the number of slave devices in the returned inspection data, the expected value being obtained based on the position address.

4. A master device in a network system comprising the master device and a plurality of slave devices and having a configuration that data is transmitted from the master device, is sequentially passed from an upmost stream-side slave device to a downmost stream-side slave device, and then is returned to the master device, and each slave device has a plurality of ports including an upstream-side port for connection to an upstream-side device and at least one downstream-side port for connection to a downstream-side device,
the master device comprising a processor, when executing a program, performs operations comprising:
acquiring topology information indicating a topology of the network system, the topology information containing a position address of each slave device, defined on the basis of an order of connection of each slave device and a type of each port used for connection between the slave devices, the type of each port including at least an input port and an output port, wherein the position address is allocated to each slave device based on an order that the slave device receives a signal output from the master device via the input port of the slave device;
switching between closing and opening of each port of each slave device, such that the downmost stream-side slave device is defined as a target slave device to be inspected and a serial topology is formed from the master device to the target slave device, on the basis of the topology information;
transmitting inspection data after the switching, and receiving returned inspection data, the inspection data including a value counting a number of slave devices in the serial topology formed in the switching; and
detecting a connection abnormality of the target slave device on the basis of a status of return of the inspection data,
wherein each slave device in the serial topology formed in the switching, increases the value in the inspection data, when each slave device receives the inspection data,
wherein the master device determines, in the detecting the connection abnormality, that the connection abnormality corresponding to erroneous selection of one of the input port and the output port of the target slave device occurs, when an expected value of the number of devices including the target slave device is different from the counted value of the number of slave devices the counted value in the returned inspection data, the expected value being obtained based on the position address.

* * * * *